United States Patent [19]

Iacobucci et al.

[11] 4,208,434

[45] Jun. 17, 1980

[54] COLOR STABLE FOOD CONTAINING ANTHOCYANIC PIGMENTS AND BIO-AVAILABLE VITAMIN C AND PROCESS FOR ITS PRODUCTION

[75] Inventors: Guillermo A. Iacobucci; James G. Sweeny, both of Atlanta, Ga.

[73] Assignee: The Coca-Cola Company, Atlanta, Ga.

[21] Appl. No.: 34,065

[22] Filed: Apr. 27, 1979

Related U.S. Application Data

[63] Continuation-in-part of Ser. No. 923,523, Jul. 11, 1978, abandoned.

[51] Int. Cl.² ............................................... A23L 1/30
[52] U.S. Cl. ..................................... 426/72; 426/250; 426/540; 426/590
[58] Field of Search ................. 426/72, 590, 250, 540; 260/210

[56] References Cited

U.S. PATENT DOCUMENTS

| | | | |
|---|---|---|---|
| 2,058,220 | 10/1936 | Basel | 426/72 |
| 3,266,903 | 8/1966 | Jurd | 426/250 |
| 3,301,683 | 1/1967 | Jurd | 426/250 |
| 3,314,975 | 4/1967 | Jurd | 426/250 |
| 3,652,290 | 3/1972 | Hammes et al. | 426/72 |
| 3,734,742 | 5/1973 | Morse | 426/72 |
| 3,958,017 | 5/1976 | Morse et al. | 426/72 |

OTHER PUBLICATIONS

Farkas ed., Topics in Flavonoid Chemistry and Biochemistry, Elsevier Sci. Pub. Co., Amsterdam–Oxford, New York, 1975, pp. 232–239.
Chem. Abstr. vol. 75, 1971, 18936t.
Chem. Abstr. vol. 85, 1976, 45168g.

*Primary Examiner*—Jeanette M. Hunter
*Attorney, Agent, or Firm*—Michael J. Gilroy

[57] ABSTRACT

A novel color-stable food product containing anthocyanin or anthocyanidin pigments and containing bio-available vitamin C. The novel food may be produced as the product of an improved food production process wherein the improvement comprises providing the bioavailable vitamin C in the form of an enolic OH substituted derivative of ascorbic acid selected from the group consisting of inorganic esters, aliphatic or alicyclic esters, and O-alkyl ethers of ascorbic acid.

28 Claims, No Drawings

COLOR STABLE FOOD CONTAINING ANTHOCYANIC PIGMENTS AND BIO-AVAILABLE VITAMIN C AND PROCESS FOR ITS PRODUCTION

RELATED APPLICATIONS

This application is a continuation-in-part of U.S. Ser. No. 923,523 filed July 11, 1978 now abandoned.

STATEMENT OF INVENTION

This invention relates generally to a naturally colored, vitamin-C-enriched food product and relates particularly to such a food which contains anthocyanin or anthocyanidin pigments and bio-available vitamin C. The invention additionally relates to an improved process for the production of such a food product.

BACKGROUND OF THE INVENTION

Since the discovery in the mid-eighteenth century that eating oranges or lemons would successfully treat scurvy, vitamin C has been, more or less continuously, used as a dietary supplement. The isolation of naturally occurring L-ascorbic acid (ascorbic acid) was followed shortly by the development of an efficient process for its synthesis. These developments, together with the recognition that its presence in the diet is essential to human health, have lead food manufacturers to attempt to add a source of bio-available vitamin C to, or to enhance the level of naturally occurring vitamin C in, their products. These attempts, however, have been unsuccessful in a significant number of applications, either as a result of the well known autoxidative instability of ascorbic acid or as a result of its reactivity toward other food components.

One example of its reactivity toward other food components, arises when ascorbic acid is present in an aqueous mixture which also contains an anthocyanic pigment. The incompatibility of anthocyanic pigments, i.e., anthocyanins or anthocyanidins, with ascorbic acid is a well established fact in the literature [Sondheimer, E. and Kertesz, Z. I., Food Res., 17, 288 (1952); Starr, M. S. and Francis, F. J., Food Technol. 22, 1293 (1968)]. If both the ascorbic acid and the anthocyanic pigment are present in solution, a chemical reaction occurs which results in the bleaching of the pigments and the destruction of the ascorbic acid. The half-life of anthocyanic pigments at pH 3 and room temperature, for the case of a beverage containing 10 ppm anthocyanidin and 600 ppm ascorbic acid, could be diminished by a factor of as much as 100. This rate of destruction has been found to be increased by increasing temperature and exposure to light.

The mechanism of the ascorbic acid-anthocyanic pigment bleaching reaction has not been conclusively proven, but at least two mechanistic theories appear to have been put forward to explain the phenomenon.

The first mechanistic theory postulates an oxidation-reduction path involving both the ascorbic acid and oxygen. In the publication "Oxygen and Ascorbic Acid Effect on the Relative Stability of Four Anthocyanin Pigments in Cranberry Juice" [Starr, M. S. and Francis, F. J., Food Technology, 22, 1293–95 (1968)], the authors trace the recognition of oxygen involvement in the ascorbic acid bleaching of anthocyanic pigments from a 1943 discovery that increasing air headspace in bottles of strawberry juice containing anthocyanin pigments increased the degradation of the pigment. A 1956 report disclosed that oxygen increased the rate, and extent, of discoloration of the red anthocyanin pigments. The Starr and Francis publication further describes previous research on ascorbic acid bleaching of anthocyanins in the presence of oxygen that supports the theory that a reactive intermediate is formed from an initial oxygen-ascorbic acid reaction (possibly hydrogen peroxide or a free radical species). This intermediate subsquently reacts with the anthocyanic pigment. From their original research reported in this publication, Starr and Francis disclose that anthocyanin bleaching is increased by increasing the concentration of either oxygen or ascorbic acid.

In a more recent publication by Shirkhande and Francis, [Effect of Flavonols on Ascorbic Acid and Anthocyanin Stability in Model Systems, J. Food Sci., 39, 904 (1974)], the authors note both the theory that hydrogen peroxide (formed through a free radical mechanism from oxygen and ascorbic acid) is the reactive intermediate in anthocyanin bleaching and the fact that flavonols retard the autoxidation of ascorbic acid. The authors note also the previously published observation that the simultaneous presence of both flavonols and anthocyanins in ascorbic acid solutions appears to protect the ascorbic acid from oxidation. The results of their original research reported in this publication demonstrate that the addition of the flavonol anti-oxidants quercetin or quercitrin to model systems containing dissolved oxygen, ascorbic acid and four anthocyanins found in cranberries retards both the oxidation of ascorbic acid and the bleaching of the anthocyanins. The authors conclude that these results are consistent with an ascorbic acid-anthocyanin bleaching mechanism which involves a first step of oxygen-ascorbic acid reaction to form either hydrogen peroxide or a free radical species as a reactive intermediate, followed by a second step of reactive intermediate-anthocyanin bleaching.

A second mechanistic theory for ascorbic acid bleaching of anthocyanic pigments has been advanced by Jurd ["Some Advances in the Chemistry of Anthocyanin-Type Plant Pigments", pp. 123–42, in "The Chemistry of Plant Pigments," Co.O. Chichester, Ed., Academic Press, N. Y., 1972, and references therein]. This theory postulates that the bleaching reaction between these two species occurs as a result of a nucleophilic substitution by ascorbic acid at the 4 position of the pigment to yield a colorless, 4-substituted flav-2-ene [ibid, p. 139].

In addition to its tendency to bleach anthocyanin and anthocyanidin pigments, the tendency of ascorbic acid to autoxidize in acidic aqueous solutions in the presence of air has long been known. This autoxidative process is known to be accelerated by copper (II) ions, by the enzyme ascorbic acid oxidase [Dawson, C. R., Ann. N.Y. Acad. Sci., 88, 353 (1960)], and by light [McAlpine, R. D., et al., Can. J. Chem., 51, 1682 (1973)]. Because of this autoxidation phenomenon, and because the autoxidation rate is increased by light and other factors, several research groups have attempted to synthesize derivatives of ascorbic acid which retain some degree of in vivo vitamin C activity but which do not exhibit this autoxidative degradation.

As a result of these efforts, it has been observed that derivatives of ascorbic acid which are substituted at the enolic OH function at the $C_2$ and/or $C_3$ positions form a family of vitamin C analogs which are able to resist autoxidation because of the blocking of the ene-diol functional group.

Many of these derivatives, particularly the ascorbyl esters at $C_2$ and/or $C_3$, were tested on the scorbutic guinea pig and found to have retained a vitamin C potency equivalent to unsubstituted ascorbic acid. Such retention of vitamin C potency was shown for the 2-O-phosphate [Iami, Y, et al., Jap. J. Pharmacol. 17, 317, (1967)] and the 2-O-benzoate [ibid, 17, 330, (1967)] in the scorbutic guinea pig, and for the 2-O-sulfate in the scorbutic rainbow trout [Halver, J. E., et al., Ann N.Y. Acad. Sci., 258, 81 (1975)] and monkey [Baker, E. M., et al., Ann N.Y Acad. Sci., 258, 72(1975)].

In addition to the aforementioned ascorbyl esters, $C_3$ and/or $C_2$ O-alkylated derivatives of ascorbic acid have been shown to exhibit both stability to autoxidation and in vivo vitamin C activity, albeit with the activity at a significantly lower level. For example, the 3-O-methyl ascorbic acid was found to exert an anti-scorbutic effect on the guinea pig of 1/50 of vitamin C when given orally [Gould, B. S., et al., Arch. Biochem., 23, 205 (1949)].

Despite the discovery of such non-autoxidizing vitamin C derivatives, and despite the ever-increasing interest in providing a food containing both bio-available ascorbic acid and anthocyanin or anthocyanidin pigments, the development of such a food has been hindered by the incompatibility between such natural pigments and vitamin C, which has heretofore been perceived to result from either a nucleophilic substitution by ascorbic acid at the 4 position of the anthocyanic pigment or an oxidation-reduction reaction involving ascorbic acid, oxygen and the anthocyanic pigment.

SUMMARY

It has now been discovered that a color-stable food composition may be produced which contains both anthocyanic pigments and bio-available vitamin C. Such foods may include dry mixes adapted to be mixed with water, beverage syrups or concentrates adapted to be diluted with water, or single-strength beverages. It has also been discovered that such a color-stable, bio-available vitamin C-enriched food composition product, of the type wherein the color is provided by one or more anthocyanic pigments, may be produced by a process comprising combining a food base, an anthocyanic pigment, and ascorbic acid which has been blockingly substituted at one or both of the enolic OH functions. Such blocking substituents may include —R, —SO$_3$H, —PO$_3$H$_2$, or

where R is an aliphatic or alicyclic residue of from one to ten carbons.

DETAILED DESCRIPTION OF THE INVENTION

A complete understanding of the invention will ge gained by those skilled in the art from the following description.

It has now been discovered that certain ascorbic acid derivatives, in which the enediol function has been blockingly substituted at one or both of the enolic OH functions, do not bleach anthocyanins or anthocyanidins as rapidly as does unsubstituted ascorbic acid. It has also been discovered that this effect is limited to certain classes of substituents at the enolic functions. Several blockingly substituted ascorbic acid species are shown below.

| Formula | Ascorbic Acid (AA) and Derivatives | | |
|---|---|---|---|
| | Substituents | Common Name | (Ref. No.) |
| (structure 1) | $R_I = R_{II} = H$ | AA | (1) |
| | $R_I = -H; R_{II} = -CH_3$ | 3-O-methyl AA | (2) |
| | $R_I = -R_{II} = -CH_3$ | 2,3-O-dimethyl AA | (3) |
| | $R_I = -SO_3H; R_{II} = -H$ | AA 2-O-sulfate | (4) |
| | $R_I = -PO_3H_2; R_{II} = -H$ | AA 2-O-phosphate | (5) |
| | $R_I = $ (isovaleryl); $R_{II} = -H$ | 2-O-isovaleryl AA | (6) |
| | $R_I = $ (pivalyl); $R_{II} = -H$ | 2-O-pivalyl AA | (7) |
| | $R_I = $ (caproyl); $R_{II} = -H$ | 2-O-caproyl AA | (8) |
| (structure 2) | $R_I = R_{II} = -H$ | 5,6-isopropylidene AA | (9) |
| | $R_I = -R_{II} = -CH_3$ | 2,3-O-dimethly-5,6-isopropylidene AA | (10) |

As is well known to those skilled in the art, ascorbic acid, and those of its derivatives which retain one or more acidic hydrogens, may be reacted with a base to form a ascorbate salt and water. In this regard, the sulfate and phosphate inorganic esters shown above were obtained and used in the experiments described below in the form of their dibasic salts, of barium and magnesium respectively, while the remaining species were used in their free acid form. Regardless of whether the free acid or the salt form of any particular species is utilized, it is contemplated that the other form of the species is fully its equivalent and will perform in a substantially similar manner and have substantially the same effect as the form chosen.

Certain of the O-alkylated and the inorganic ester derivatives of ascorbic acid shown in Table I were tested for their relative bleaching power on aqueous acidic solutions of a representative anthocyanidin, i.e., apigeninidin chloride, according to the protocol set forth in Example I.

EXAMPLE I

Anthocyanidin Bleaching by Ascorbic Acid Derivatives 10 mg. of apigeninidin chloride, 1.92 g. of citric acid and 250 mg. of sodium benzoate were transferred to a 1-liter volumetric flask, dissolved in deionized water and diluted to the mark. 100 ml. aliquots of the resulting solution were pipetted into each of seven 100 ml. volumetric flasks which, respectively, contained the following amounts of the species shown above: 60 mg. of ascorbic acid (Ref. No. 1); 65 mg. of 3-O-methyl ascorbic acid (Ref. No. 2); 70 mg. of 2,3-O-dimethyl ascorbic acid (Ref. No. 3); 137 mg. of ascorbic acid 2-O-sulfate (as the dibasic barium salt) (Ref. No. 4); 100 mg. of ascorbic acid 2-O-phosphate (as the dibasic magnesium salt) (Ref. No. 5); 74 mg. of 5,6-isopropylidene ascorbic acid (Ref. No. 9); and 84 mg. of 2,3-O-dimethyl-5,6-isopropylidene ascorbic acid (Ref. No. 10). Each flask was stoppered and stored at ambient temperature and light. At varying time intervals, a small aliquot of each of the seven test solutions was withdrawn from its flask and its absorbance at 470 nm was measured on a Beckman 25 UV/VIS spectrophotometer using quartz cells and a deionized water reference. Raw absorbance data was divided by the absorbance for each solution at zero time and multiplied by 100 to yield a value for "% color remaining." The results are shown in Table I.

Table I

"% Color Remaining" vs Time for Each Species*

| Ref. No./t (hrs.) | 0 | 2 | 5 | 22 | 46 | 60 | 156 | 204 |
|---|---|---|---|---|---|---|---|---|
| 1 | 100 | 100 | 100 | 90 | 78 | 8 | 5 | 4 |
| 2 | 100 | 100 | 100 | 100 | 99 | 99 | 97 | 96 |
| 3 | 100 | 100 | 100 | 101 | 100 | 99 | 93 | 87 |
| 4 | 100 | 100 | 100 | 100 | 100 | 98 | 95 | 94 |
| 5 | 100 | 100 | 100 | 96 | 94 | 92 | 86 | 83 |
| 9 | 100 | 100 | 100 | 0 | 0 | 0 | 0 | 0 |
| 10 | 100 | 100 | 100 | 100 | 100 | 100 | 99 | 91 | 89 |

*"% Color Remaining" = $(Abs_t/Abs_{t=0}) \times 100$; Species by Ref. No. as shown above.

The data shown in Table I qualitatively shows the relative rates at which the various species bleach apigeninidin chloride. Both of the anthocyanidin solutions which contained ascorbic acid species which have unsubstituted enolic OH functions, i.e., ascorbic acid (Ref. No. 1) and 5,6-isopropylidene ascorbic acid (Ref. No. 9) show a dramatic color loss of over 90% within 60 hours and over 95% color loss at 204 hours. On the other hand, the anthocyanidin solutions which contained ascorbic acid species having at least one of their enolic functions substituted, i.e., 3-O-methyl ascorbic acid (Ref. No. 2); 2,3-O-dimethyl ascorbic acid (Ref. No. 3); ascorbic acid 2-O-sulfate (Ref. No. 4), ascorbic acid 2-O-phosphate (Ref. No. 5) and 2,3-O-dimethyl-5,6-isopropylidene ascorbic acid (Ref. No. 10) show less than 8% color loss at 60 hours and less than 20% color loss at 204 hours. With the exception of the 2-O-phosphate, which demonstrated an 8% color loss at 60 hours, the enolic OH-substituted species in this latter group demonstrated less than 3% color loss at 60 hours. As is apparent from the consideration of such data, inorganic esterification or O-alkylation at one or both of the enolic OH functions of ascorbic acid causes a dramatic lessening of the anthocyanidin bleaching rate.

In order to qualitatively determine the relative bleaching power of certain ascorbic acid derivatives on anthocyanidins, selected 2-O-esters of ascorbic acid, as well as ascorbic acid, were tested with the representative anthocyanidin apigeninidin chloride according to the test protocol described in Example II.

EXAMPLE II

Anthocyanidin Bleaching By Aliphatic Ester Ascorbic Acid Derivatives

A standard solution was made up consisting of 20 mg apigeninidin chloride, 1.92 g of citric acid and 200 mg sodium benzoate dissolved in deionized water and diluted to the mark in a one liter volumetric flask. One hundred ml aliquots were pipetted into each of four 100 ml volumetric flasks which, respectively, contained the following amounts of the following species: 60 mg of ascorbic acid (Ref. No. 1); 89 mg of 2-O-isovaleryl ascorbic acid (Ref. No. 6); 89 mg of 2-O-pivalyl ascorbic acid (Ref. No. 7); 93 mg of 2-O-caproyl ascorbic acid (Ref. No. 8). Each flask was stoppered and stored at ambient temperature under ambient laboratory light. At varying intervals a small aliquot was withdrawn from each of the four flasks and its absorbance was measured at 470 nm on a Beckman 25 UV/VIS spectrometer using quartz cells and a 0.01 M citric acid, 200 ppm sodium benzoate solution as reference. Absorbance at time "t" was divided by the absorbance for each solution at zero time and multiplied by 100 to yield a value for "% Color Remaining". The results are shown in Table II.

Table II

% Color Remaining vs Time for Each Species*

| Ref.No./t (hrs.) | 0 | 30 | 50 | 72 | 118 | 142 | 166 | 191 | 215 | 287 |
|---|---|---|---|---|---|---|---|---|---|---|
| 1 | 100 | 95 | 88 | 79 | 65 | 58 | 50 | 43 | 38 | 24 |
| 6 | 100 | 98 | 95 | 90 | 86 | 83 | 79 | 75 | 72 | 62 |
| 7 | 100 | 95 | 92 | 85 | 77 | 72 | 67 | 61 | 56 | 42 |
| 8 | 100 | 94 | 89 | 82 | 73 | 68 | 63 | 57 | 53 | 39 |

*"Color Remaining" = $(Abs_t/Abs_{t=0}) \times 100$; Species by Ref. No. as shown above.

The data in Table II demonstrates that the substitution at the $C_2$—OH of ascorbic acid by an aliphatic acyl group decreases the ability of the species to bleach apigeninidin chloride as compaired with that of free ascorbic acid. The rate at which the 2-O-isovaleryl ascorbic acid (Ref. No. 6) bleaches the anthocyanidin appears to be significantly slower than that for the other two esters tested (Ref. Nos. 7 and 8). These differences in the rate of bleaching correllate closely with the observed differences in the rate of hydrolysis, to free ascorbic acid for the respective esters, that is, the rate at which free ascorbic acid is being released into the solution.

In order to qualitatively determine the relative bleaching power of substituted ascorbic acid derivatives on anthocyanins, selected ascorbic acid species were tested with the representative anthocyanin cyanidin-3- rutinoside according to the test protocol described in Example III.

Example III

Anthocyanin Bleaching By Inorganic Ester Ascorbic Acid Derivatives

A test protocol identical to that described in Example I was performed for ascorbic acid (Ref. No. 1), ascorbic acid 2-O-sulfate (as the dibasic barium salt) (Ref. No. 4), ascorbic acid 2-O-phosphate (as the dibasic magnesium salt) (Ref. No. 5), 5,6-isopropylidene ascorbic acid (Ref. No. 9) and for a control solution containing no ascorbic acid species. 20 mg. of cyanidin-3-rutinoside was substituted for the 10 mg. of apigeninidin chloride used in Example I. Chemical grades, experimental procedures, storage conditions, instrumental analysis and raw data treatment methods were essentially identical to those described in Example I. The tabulated results of Example III are shown in Table III.

Table III

| "% Color Remaining" vs Time for Each Species* | | | | | | | | |
|---|---|---|---|---|---|---|---|---|
| Ref. No./t(hrs.) | 0 | 24 | 48 | 72 | 96 | 168 | 192 | 240 | 264 |
| Control | 100 | 99 | 99 | 98 | 99 | — | 98 | — | 97 |
| 1 | 100 | 91 | 77 | 65 | 55 | — | 28 | — | 16 |
| 4 | 100 | 97 | 94 | 93 | — | 84 | — | 79 | — |
| 5 | 100 | 98 | 94 | 92 | — | 81 | — | 76 | — |
| 9 | 100 | 74 | 46 | 28 | 19 | — | 10 | — | 7 |

*"% Color Remaining" = $(Abs_t/Abs_{t=0}) \times 100$; Species by Ref. No. as shown above The data shown in Table III shows a significantly lower anthocyanin bleaching rate for the 2-O-sulfate and the 2-O-phosphate species compared to that exhibited by ascorbic acid (1) and 5,6-isopropylidene ascorbic acid (9). The 2-O-sulfate and 2-O-phosphate species (Ref. Nos. 4 and 5) show less than 7% color loss at approximately 50 hours and less than 25% color loss at 240 hours, whereas ascorbic acid (1) and 5,6-isopropylidene ascorbic acid (9) show approximately 23% and 54% color loss, respectively, at approximately 50 hours and show a color loss of approximately 79% and 91%, respectively, at 264 hours. Thus, from a consideration of the data shown on Table III, it is apparent that the ability of ascorbic acid to bleach anthocyanins is markedly decreased by inorganic esterification at the C-2 enolic OH functions.

This phenomenon has not been shown or suggested heretofore perhaps because the mechanism of the bleaching reaction between anthocyanic pigments and ascorbic acid has been subject to two conflicting and mutually exclusive theories. On the one hand, a nucleoplilic substitution by ascorbic acid at the 4 position of the anthocyanic pigments has been postulated. On the other hand, an oxidation-reduction reaction involving a reaction between dissolved oxygen and ascorbic acid has been suggested. Faced with such conflicting theories of the bleaching reaction's mechanism, it is possible that researchers have been lead away from the discovery disclosed and claimed herein.

The results of Examples I, II and III indicate that the rate of the bleaching reaction may be substantially reduced by the substitution of at least one enolic OH function on the ascorbic acid residue by certain organic or inorganic substituents. When the remaining two OH functions (on $C_5$ and $C_6$) are substituted (by conversion to the 5,6-isopropylidene analog) with the enolic OH sites left unsubstituted, the bleaching reaction is actually enhanced. Why such enhancement should occur is unknown, but the fact that the rate of the bleaching reaction is not lessened over that of ascorbic acid amply demonstrates the fact that it is the substitution of a blocking group at at least one of the enolic OH sites that effectively reduces the rate of bleaching.

With regard to the selection of blocking substituents, the examples described above utilized selected alkyl esters, selected inorganic esters and selected O-alkyl ethers of ascorbic acid. Thus in its broadest form the blocking substituent may be described as being selected from the group consisting of —R, —SO$_3$H, —SO$_3^-$, —PO$_3$H$_2$, —PO$_3$H$^-$, and

where R (either in the ether or in the ester derivative) may be an aliphatic or alicyclic residue of from one to ten carbons.

In this regard, the broad concept of the inventive process comprises combining a food base, an anthocyanic pigment and an ascorbic acid derivative which is blockingly substituted at at least one enolic OH function with the types of substituent groups shown in Examples I, II and III. The utility of the inventive process, even in its broadest aspects, is dependent upon three factors, each of which relates to the integrity of the food composition product produced thereby.

First, and more importantly, the process must be carried out under conditions which are not destructive to either the vitamin C derivative or the anthocyanic pigment. Thus the process would have utility for the production of a single-strength beverage (or for a beverage syrup or concentrate) in which the ingredients were maintained at an acidic pH to the point of consumption by a consumer, but would not have utility in any beverage, syrup or concentrate which has a neutral or basic pH since both ascorbic acid and anthocyanic pigments tend to undergo decomposition at such pH levels. In the case of dry food products for which the intended use contemplates mixing with water prior to consumption, e.g., gelatin dessert mixes or dry beverage mixes, the food base with which the pigment and the ascorbic acid derivative are combined must contain some component which will impart sufficient acidity to the ultimately contemplated aqueous mixture in order to minimize such decomposition. Similarly, exposure of the food to excessive amounts of heat, light or oxygen should be avoided.

Second, the ascorbic acid derivative should be reasonably stable to acid hydrolysis to the point of consumption in order that liberation of free ascorbic acid, and the consequent pigment bleaching, will be minimized. In the case of an acidic beverage syrup or concentrate, as well as in the case of an acidic single-strength beverage, the preferred vitamin C derivative must, to at least a substantial extent, hydrolyse to free ascorbic acid slowly relative to the desired lifetime of the anthocyanic pigment.

Third, the vitamin C derivative must hydrolyze in vivo to an extent sufficient to exert some beneficial antiscorbutic effect.

As will be understood by those skilled in the art, none of the three factors discussed above are susceptible to setting of exact quantitative limits, but, rather, the extent and existence of each will exert a combined effect for each individual instance. For example, a selected ascorbic acid may be found to hydrolyse rapidly in an aqueous mixture, i.e. to have a half-life in acidic solution of, e.g., 24 hours, and, at the same time, to have an antiscorbutic effect in vivo close to that of Vitamin C. Such a derivative would have relatively greater utility in a dry beverage powder (where consumption follows quickly after mixing) than it would in a single strength beverage (where days or weeks may separate mixing and consumption). Thus each of the three factors, i.e. non-destructive food matrix conditions, slow in vitro hydrolysis and high in vivo antiscorbutic activity, must be weighed in view of the contemplated food product in order for the process to have its optimum utility.

Suitable blocking substituents may include inorganic esters, aliphatic or alicyclic organic esters having from one to ten carbons, and esters having from one to ten carbons. If such blocking substituents are desired at both enolic OH functions such blocking may take the form either of two separate substituents or one bifunctional substituent capable of reacting with both enolic OH's to form a heterocyclic ring which includes $C_2$ and $C_3$ and both enolic oxygens. While no recognizable beneficial effect will result specifically therefrom, such ascorbic acid derivatives may contain additional substituents as in the case of the 5,6-isopropylidene derivative of the dimethyl species (Ref. No. 10), and such derivatives are specifically contemplated to be within the scope of this invention.

In the preferred embodiment of the process the ascorbic acid derivative provided will be selected from a group comprising derivatives that are readily hydrolyzed in vivo to yield approximately equivalent levels of free ascorbic acid. Such derivatives include the 2-O-sulfate and 2-O-phosphate, as well as those aliphatic and-/or alicyclic carboxylic acid esters of ascorbic acid at $C_2$ or $C_3$, which are hydrolyzed at the intestinal level by the gut microflora or by pancreatic esterases, provided that such inorganic and organic esters of ascorbic acid show a reasonable stability towards hydrolysis in the food systems.

In the optimum embodiment, or best mode, of the invention the ascorbic acid derivative of choice is ascorbic acid 2-O-phosphate, since that derivative has been demonstrated to impart full vitamin C potency in vivo, while at the same time exhibiting a low rate of anthocyanic pigment bleaching.

As indicated above, the process is equally applicable for use in conjunction with any anthocyanic pigment of the anthocyanidin or anthocyanin type as exemplified by the species apigeninidin chloride and cyanidin-3-rutinoside, respectively.

In addition to the novel process described above, the invention also encompasses novel food products produced by the process. In their broadest embodiment these novel foods comprise a food base, an anthocyanic pigment and an ascorbic acid derivative having at least one enolic OH function blockingly substituted by the above-described substituents. The term food base, as used herein, is understood to mean any food or combination of foods, including colorants, as that term is defined under the Federal Food, Drug and Cosmetic Act or regulations promulgated thereunder. The term food base includes dry mixes, such as powders, crystals and amorphous masses which are substantially free of water, but which are intended to be mixed with water prior to consumption. The term food base also includes aqueous solutions, slurries, suspensions, emulsions or mixtures either as concentrates or syrups which are intended for dilution prior to consumption or single-strength aqueous beverages. Finally, the term food base includes single strength beverages.

The term food base, then, means any food to which it is desired to add an anthocyanic pigment and bio-available Vitamin C. Examples of such food bases may include dry gelatin mixes, dry beverage mixes, beverage syrups and concentrates, and single-strength beverages. It is only necessary that the food base be sufficiently benign toward the pigment and the ascorbic acid derivative so as to prevent their destruction of at the point when the pigment and the derivative are brought into contact with the food base and upon subsequent dilution to an aqueous matrix.

In the preferred embodiment, the novel foods produced by the process described herein comprise a beverage containing a beverage base, an anthocyanic pigment and an ascorbic acid derivative which has at least one enolic OH function esterified by an aliphatic or alicyclic organic acid or an inorganic acid, or O-alkylated. An example of one preferred embodiment of such a beverage is described in Example IV below.

EXAMPLE IV

Preparation of an Orange Flavored Beverage

To one liter of water was added 100 g sugar, 2.0 g citric acid, 0.2 g sodium benzoate, 1.0 g commercial spray dried orange flavor, 20 mg apigeninidin chloride and 1.0 g of ascorbic acid 2-O-phosphate (as the dibasic magnesium salt). The resulting mixture was then placed in glass bottles and carbonated with 2 volumes of carbon dioxide to give an orange flavored single-strength beverage.

From the foregoing description, it will be apparent that changes in the food composition itself or in the process steps or order of steps for its production, as described herein may occur to persons skilled in the art without departing from the scope and spirit of the invention. Accordingly, the foregoing description is considered to be only exemplary of the invention as defined in the appended claims.

What is claimed is:

1. An improved process for formulating a color stable food containing bio-available vitamin C and an anthocyanic pigment, of the type wherein said anthocyanic pigment and said bio-available vitamin C are combined with a food base prior to consumption, the improvement comprising providing said bio-available vitamin C in the form of ascorbic acid, or a soluble, non-toxic salt thereof, blockingly substituted at at least one enolic OH function.

2. The improved process as set forth in claim 1 where said food base comprises a dry mixture of food components, and wherein said anthocyanic pigment and said bio-available vitamin C are dry.

3. The improved process as set forth in claim 1 wherein said food base comprises a mixture of food components in water.

4. The improved process as set forth in claim 3 wherein said food mixture comprises a beverage syrup or concentrate.

5. The improved process as set forth in claim 3 wherein said food mixture comprises a single-strength beverage.

6. A process for improving the color stability of an anthocyanic pigment in a beverage containing said pigment and bio-available vitamin C comprising providing said bio-available vitamin C as ascorbic acid, or a soluble, non-toxic salt thereof, blockingly substituted at one enolic OH function.

7. The process as set forth in claim 6 wherein said blocking substituent is selected from the group consisting of —R, —SO$_3$H, —SO$_3^-$, PO$_3$H$_2$, —PO$_3$H$^-$ and

wherein R is an aliphatic or alicyclic organic residue of from one to ten carbons.

8. The process as set forth in claim 7 wherein said substituent is selected from the group consisting of

—SO$_3$H, —SO$_3^-$, —PO$_3$H$_2$ and —PO$_3$H$^-$ where R is an aliphatic or alicyclic organic residue of from one to ten carbons.

9. The process as set forth in claim 8 wherein said substituent is selected from the group consisting of SO$_3$H, —SO$_3^-$, —PO$_3$H$_2$ and —PO$_3$H$^-$.

10. The process as set forth in claim 8 wherein said substituent is selected from the group consisting of

wherein R is an aliphatic or alicyclic organic residue of from one to ten carbons.

11. A process for producing a color-stable, vitamin C-enriched food of the type wherein at least a portion of the color of said food is provided by a pigment selected from the group consisting of anthocyanins, anthocyanidins and combinations thereof, comprising combining a food base, said pigment and an ascorbic acid derivative of the formula

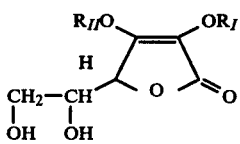

or a soluble, non-toxic salt thereof, wherein one of R$_I$ and R$_{II}$ is selected from the group consisting of —R, —SO$_3$H, —SO$_3^-$, —PO$_3$H$_2$, —PO$_3$H$^-$ and

wherein R is an aliphatic or alicyclic organic residue containing from one to ten carbons and wherein the other of R$_I$ and R$_{II}$ is selected from the group consisting of —H, —R, —SO$_3$H, —SO$_3^-$, PO$_3$H$_2$, —PO$_3$H and

wherein R is an alphatic or alicyclic organic residue containing from one to ten carbons.

12. The process as set forth in claim 11 wherein one of R$_I$ and R$_{II}$ is selected from the group consisting of

—SO$_3$H, —SO$_3^-$, PO$_3$H$_2$ and —PO$_3$H$^-$, and wherein the other of R$_I$ and R$_{II}$ is selected from the group consisting of —H,

—SO$_3$H, —SO$_3^-$, PO$_3$H$_2$ and —PO$_3$H$^-$, wherein R is an aliphatic or alicyclic organic residue of from one to ten carbons.

13. The process as set forth in claim 12 wherein one of R$_I$ and R$_{II}$ is selected from the group consisting of SO$_3$H, —SO$_3^-$, PO$_3$H$_2$ and —PO$_3$H$^-$, and wherein the other of R$_I$ and R$_{II}$ is selected from the group consisting of —H, SO$_3^-$, —SO$_3$H, —PO$_3$H$_2$ and —PO$_3$H$^-$.

14. The process as set forth in claim 13 wherein one of R$_I$ and R$_{II}$ is selected from the group consisting of

and wherein the other of R$_I$ and R$_{II}$ is selected from the group consisting of —H and

wherein R is an aliphatic or alicyclic organic residue of from one to ten carbons.

15. The process as set forth in claim 14 wherein said pigment comprises a combination of an anthocyanin and an anthocyanidin.

16. The process as set forth in claim 14 wherein said pigment comprises an anthocyanin.

17. The process as set forth in claim 16 wherein said anthocyanin comprises cyanidin-3-rutinoside.

18. The process as set forth in claim 14 wherein said pigment comprises an anthocyanidin.

19. The process as set forth in claim 18 wherein said anthocyanidin comprises apigeninidin chloride.

20. A food composition comprising a food base, an anthocyanic pigment and an ascorbic acid derivative having at least one enolic OH function blockingly substituted.

21. A food composition comprising a food base, a pigment selected from the group consisting of anthocyanins, anthocyanidins and combinations thereof, and an ascorbic acid derivative of the formula

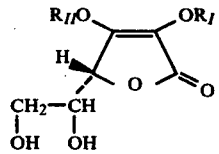

or a non-toxic salt thereof, wherein one of $R_I$ and $R_{II}$ is selected from the group consisting of —R, —SO$_3$H, —SO$_3^-$, —PO$_3$H$_2$, —PO$_3$H$^-$ and

wherein R is an aliphatic or alicyclic organic residue containing from one to ten carbons, and wherein the other of $R_I$ and $R_{II}$ is selected from the group consisting of —H, —R, —SO$_3$H, —SO$_3^-$, PO$_3$H$_2$, —PO$_3$H$^-$ and

wherein R is an aliphatic or alicyclic organic residue containing from one to ten carbons.

22. The food compositions as set forth in claim 21 wherein said food composition is dry.

23. The food composition as set forth in claim 21 wherein said food composition comprises a multiple strength syrup or concentrate.

24. The food composition as set forth in claim 21 wherein said food composition comprises a single strength beverage.

25. A food composition comprising a food base, a pigment selected from the group consisting of anthocyanins, anthocyanidins and combinations thereof, and an ascorbic acid derivative of the formula

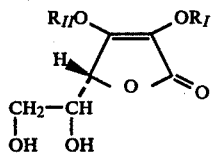

or a non-toxic salt thereof, wherein one of $R_I$ and $R_{II}$ is a substituent selected from the group consisting of

—SO$_3$H, —SO$_3^-$, PO$_3$H$_2$ and —PO$_3$H$^-$ and the other of $R_I$ and $R_{II}$ is a substituent selected from the group consisting of —H,

—SO$_3$H, —SO$_3^-$ PO$_3$H$_2$ and —PO$_3$H$^-$, wherein R is an aliphatic or alicyclic organic residue of from one to ten carbons.

26. The food composition as set forth in claim 25 wherein one of $R_I$ and $R_{II}$ is a substituent selected from the group consisting of —SO$_3$H, —SO$_3^-$, —PO$_3$H$_2$ and —PO$_3$H$^-$ and the other of $R_I$ and $R_{II}$ is a substituent selected from the group consisting of —H, —SO$_3$H, —SO$_3^-$, —PO$_3$H$_2$ and —PO$_3$H$^-$.

27. The food composition as set forth in claim 26 wherein one of $R_I$ and $R_{II}$ is selected from the group consisting of

and where the other of $R_I$ and $R_{II}$ is selected from the group consisting of —H and

wherein R is an aliphatic or alicyclic organic residue of from one to ten carbons.

28. The food composition as set forth in claim 26 wherein said ascorbic acid derivative comprises ascorbic acid 2-O-phosphate or a non-toxic salt thereof.

* * * * *